United States Patent
Le et al.

(10) Patent No.: US 9,940,510 B2
(45) Date of Patent: Apr. 10, 2018

(54) DEVICE FOR IDENTIFYING DIGITAL CONTENT

(71) Applicant: HEWLETT-PACKARD DEVELOPMENT COMPANY, L.P., Houston, TX (US)

(72) Inventors: Andre Le, Pittsburgh, PA (US); Mark Dorn, San Diego, CA (US); Alexis Katherine Gregorich, San Diego, CA (US); Elaine Yan Chi Yuan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 128 days.

(21) Appl. No.: 15/023,494

(22) PCT Filed: Sep. 27, 2013

(86) PCT No.: PCT/US2013/062173
§ 371 (c)(1),
(2) Date: Mar. 21, 2016

(87) PCT Pub. No.: WO2015/047297
PCT Pub. Date: Apr. 2, 2015

(65) Prior Publication Data
US 2016/0210506 A1 Jul. 21, 2016

(51) Int. Cl.
*G06F 9/00* (2006.01)
*G06K 9/00* (2006.01)
(Continued)

(52) U.S. Cl.
CPC ....... *G06K 9/00416* (2013.01); *G06F 3/0425* (2013.01); *G06F 17/30017* (2013.01);
(Continued)

(58) Field of Classification Search
None
See application file for complete search history.

(56) References Cited

U.S. PATENT DOCUMENTS 5,848,426 A * 12/1998 Wang ............... G06F 17/30011
358/448
6,501,855 B1 * 12/2002 Zelinski ........... G06F 17/30253
382/160
(Continued)

FOREIGN PATENT DOCUMENTS

KR 20100055145 A 5/2010

OTHER PUBLICATIONS

From INK to Data, http://www.inkdata.eu/eng/digital-pen/digital-pen-recognition.html.

*Primary Examiner* — Shervin Nakhjavan
(74) *Attorney, Agent, or Firm* — HP Inc. Patent Department (57) ABSTRACT

Examples disclosed herein provide for the sharing of digital content stored on a device via an image that is representative of the digital content. The device, in response to selection of digital content stored on the device, extracts frames from the digital content that are representative of the digital content. In response to selection of one of the frames, the device captures digitally handwritten customizations made to the selected frame to create a customized image. The device extracts features at least from the handwritten customizations made to the selected frame to identify the customized image. The device uploads the digital content, the customized image, and the extracted features to a remote database.

15 Claims, 7 Drawing Sheets

(51) Int. Cl.
  *G06F 17/30* (2006.01)
  *G06F 3/042* (2006.01)
  *G06K 9/18* (2006.01)
  *H04L 29/08* (2006.01)

(52) U.S. Cl.
  CPC .. *G06F 17/30247* (2013.01); *G06F 17/30864* (2013.01); *G06K 9/18* (2013.01); *H04L 67/1085* (2013.01)

(56) References Cited

U.S. PATENT DOCUMENTS

| | | | |
|---|---|---|---|
| 6,625,335 B1* | 9/2003 | Kanai | G06F 17/30259 382/177 |
| 7,639,876 B2 | 12/2009 | Clary et al. | |
| 7,669,148 B2* | 2/2010 | Hull | G06K 9/00463 715/209 |
| 7,703,001 B2* | 4/2010 | Takaai | G06K 9/00456 715/230 |
| 7,995,118 B2 | 8/2011 | Rothschild | |
| 8,041,149 B2* | 10/2011 | Maeda | G06T 11/60 358/537 |
| 8,326,043 B2* | 12/2012 | Cavet | G06F 17/30802 382/162 |
| 8,438,163 B1* | 5/2013 | Li | G06F 17/3028 382/159 |
| 8,521,737 B2* | 8/2013 | Hart | G06F 17/30247 707/736 |
| 8,634,652 B2* | 1/2014 | Lienhart | G06F 17/30802 382/124 |
| 8,751,812 B2* | 6/2014 | Daouphars | G06F 21/645 713/176 |
| 8,873,863 B2* | 10/2014 | Park | G06K 9/6201 382/181 |
| 8,886,635 B2* | 11/2014 | Cho | G06F 17/3074 707/722 |
| 9,247,309 B2* | 1/2016 | Oztaskent | H04N 21/4828 |
| 2004/0021790 A1 | 2/2004 | Iga | |
| 2004/0160624 A1 | 8/2004 | Elgar et al. | |
| 2005/0055281 A1* | 3/2005 | Williams | G06Q 10/00 235/383 |
| 2006/0029296 A1* | 2/2006 | King | H04N 1/00244 382/313 |
| 2006/0230069 A1* | 10/2006 | Chu | G06F 17/30056 |
| 2007/0195370 A1* | 8/2007 | Suga | G06F 17/243 358/1.18 |
| 2007/0196033 A1 | 8/2007 | Russo | |
| 2008/0292191 A1* | 11/2008 | Okita | H04N 1/387 382/187 |
| 2009/0252417 A1* | 10/2009 | Perronnin | G06K 9/00879 382/186 |
| 2010/0048242 A1* | 2/2010 | Rhoads | G06F 17/30244 455/556.1 |
| 2010/0066751 A1* | 3/2010 | Ryu | G06F 1/1626 345/581 |
| 2010/0067793 A1* | 3/2010 | Serrano | G06K 9/6297 382/179 |
| 2010/0103463 A1* | 4/2010 | Joshi | H04N 1/00326 358/1.16 |
| 2010/0319024 A1 | 12/2010 | Hiraoka | |
| 2011/0078191 A1* | 3/2011 | Ragnet | G06F 17/30705 707/780 |
| 2012/0008001 A1 | 1/2012 | Lee | |
| 2013/0042509 A1* | 2/2013 | Hawkins | G06Q 30/06 40/124.01 |
| 2013/0273968 A1* | 10/2013 | Rhoads | G06F 17/30244 455/556.1 |
| 2013/0290840 A1* | 10/2013 | Ogishi | G06F 17/24 715/268 |
| 2014/0164507 A1* | 6/2014 | Tesch | H04L 51/10 709/204 |
| 2014/0289238 A1* | 9/2014 | Fume | G06F 17/214 707/728 |
| 2014/0297678 A1* | 10/2014 | Algreatly | G06F 17/30979 707/769 |

* cited by examiner

DEVICE FOR IDENTIFYING DIGITAL CONTENT

BACKGROUND

The emergence and popularity of mobile computing has made portable computing devices, due to their compact design and light weight, a staple in today's marketplace. With the introduction of portable computing devices, such as smartphones and tablets, users of such devices may have the ability to capture, store, and share digital content with others. For example, a user of a smartphone may capture photographs and/or videos via a camera of the smartphone, and share the content with users of other devices via a form of electronic communication, such as a text message or email.

DETAILED DESCRIPTION

Due to the ubiquitous nature of portable computing devices, users may accrue large amounts of digital content on their device, by personally capturing, the content and/or receiving content from other users. As a result, memorable content may get lost in the shuffle. For example, due to storage limitations of such devices, content may be inadvertently deleted to free up space to capture and/or receive new digital content.

Examples disclosed herein provide the ability for a sender to share digital content (e.g., a digital video, etc.) stored on a portable computing device by providing a recipient with a customized image that is representative of the digital content (e.g., a customized version of a frame taken from the digital video). As an example, the customized image may be provided as printed content on physical media, such as a printed version of the image on a greeting card, commemorating an occasion. By using an application stored on the recipient's portable computing device, the recipient may capture an image of the printed content using, for example, a camera of the device. This captured image may include a representation of the customized image included in the printed content, and the application may use the captured image to retrieve the digital content represented by the customized image from a remote database. As an example, the application may extract features from the customized image by using image recognition techniques to identify characteristics of the image. The extracted features function as a digital fingerprint of the customized image, and may be used to query the remote database in order to identify and retrieve the digital content.

The features extracted from the customized image may be from digitally handwritten customizations made by the sender while creating the customized image, in an effort to enhance identification of the digital content from the remote database. By providing an image that is representative of digital content stored on a portable computing device, users may be able to share the digital content, such as videos, such that they are more easily retrieved by the recipient.

Figure 1:
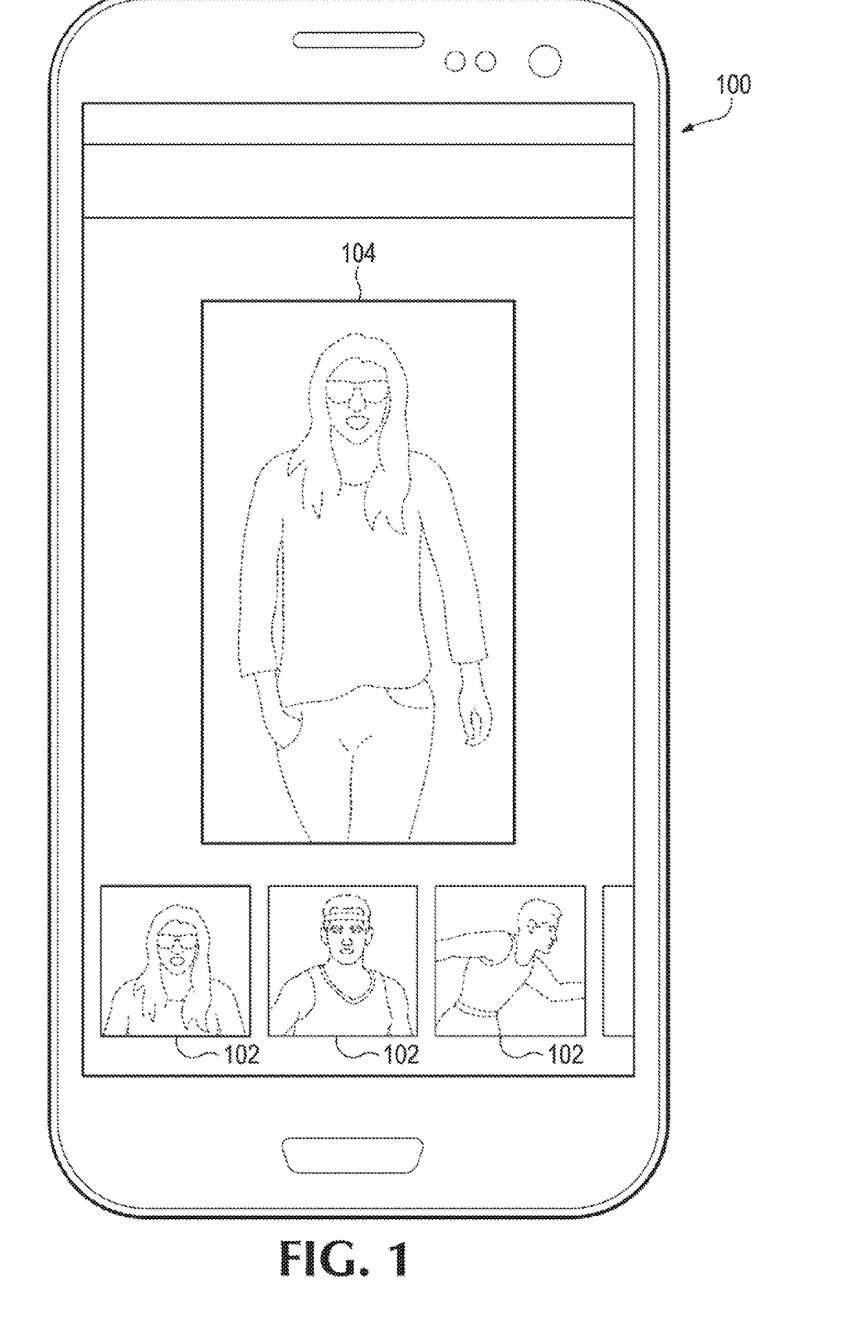
FIG. 1 illustrates an example screens of a graphical user interface (GUI) of a portable computing device.

FIG. 1 illustrates an example screenshot of a graphical user interface (GUI) of a portable computing device 100 for creating an image representative of digital content captured and/or stored on the device 100. The device 100 represents generally a smartphone, tablet computer, notebook computer, or any other portable computing device configured to send and receive network requests, send and receive data, and/or otherwise communicate with other devices via the Internet. The device 100 may communicate with the other devices via the Internet using a wireless or mobile communications technology, such as 3G, or 4G.

As an example, the image representative of the digital content may be created using an application stored on the device 100. For example, a user of the device 100 may download and install the application in order to create the image. Referring to FIG. 1, after selection of digital content for sharing, the application may extract frames 102 from the digital content that are representative of the digital content. As an example, the frames 102 may be frames of a video selected for sharing, as will be further described. Other examples of digital content that may be shared include, but are not limited to, animations, a slideshow of images, and websites.

As an example, the frames 102 may be limited to frames that contain recognizable features of the video. For example, any suitable image analysis techniques in the field of computer vision may be used for electronically perceiving and understanding an image. Such techniques may be used for identifying video frames containing features that may be of interest. Using feature detectors (e.g., Canny edge detector), every pixel of a video frame may be examined to determine whether a feature is present at that pixel. Based on the algorithm used to guide the feature detection, only certain parts of the video frame may be searched for features.

Upon detecting features, image analysis techniques, such as facial recognition, object recognition, and various forms of handwriting recognition, which include optical character recognition (OCR), may be used for identifying the recognizable features. Utilizing image analysis techniques involve processing and analyzing the video frames in order to produce numerical or symbolic information that is representative of the video.

Referring to FIG. 1, the application may extract the frames 102 shown from the video due to the detection of facial features, for example, from facial recognition techniques. After the frames 102 have been extracted from the video, the user may select one of the frames 102 (indicated as 104 for creating the customized image to provide to others. In addition to (or in place of) the facial features that have been identified in the selected frame 104, the application may extract features from digitally handwritten customizations made by the user to the selected frame 104.

Digitally handwritten customizations include, for example, changes, enhancements, or the like, made by the user to the selected frame 104 using an input device. As an example, digitally handwritten customizations include input entered by the user via a touchscreen of the device 100, using an input device. Examples of the input device include, but are not limited to, a stylus, digital pen, and one or more fingers of the user.

Figure 2A:
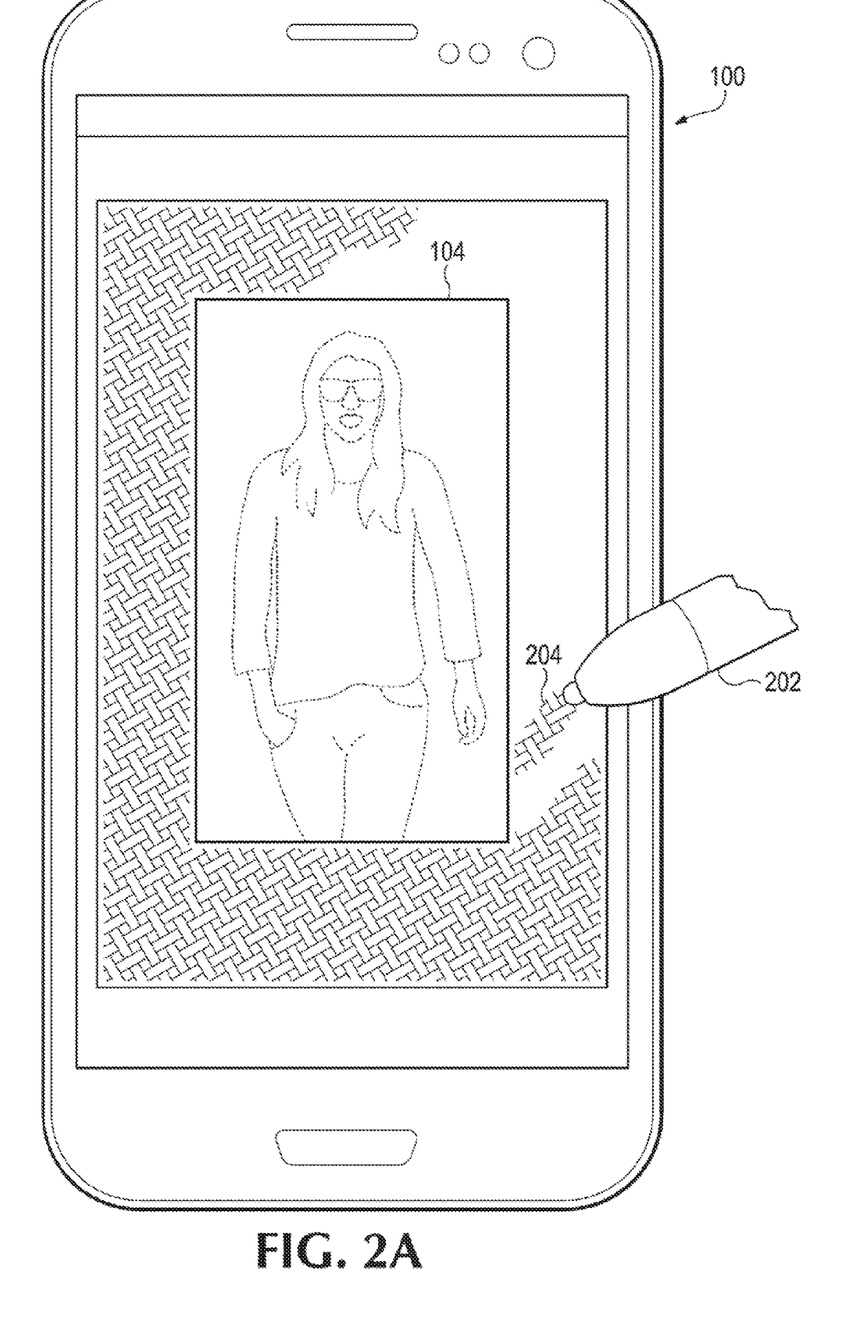
FIGS. 2A-B illustrate examples of digitally handwritten customizations that may be made by a user using an input device.
Figure 2B:
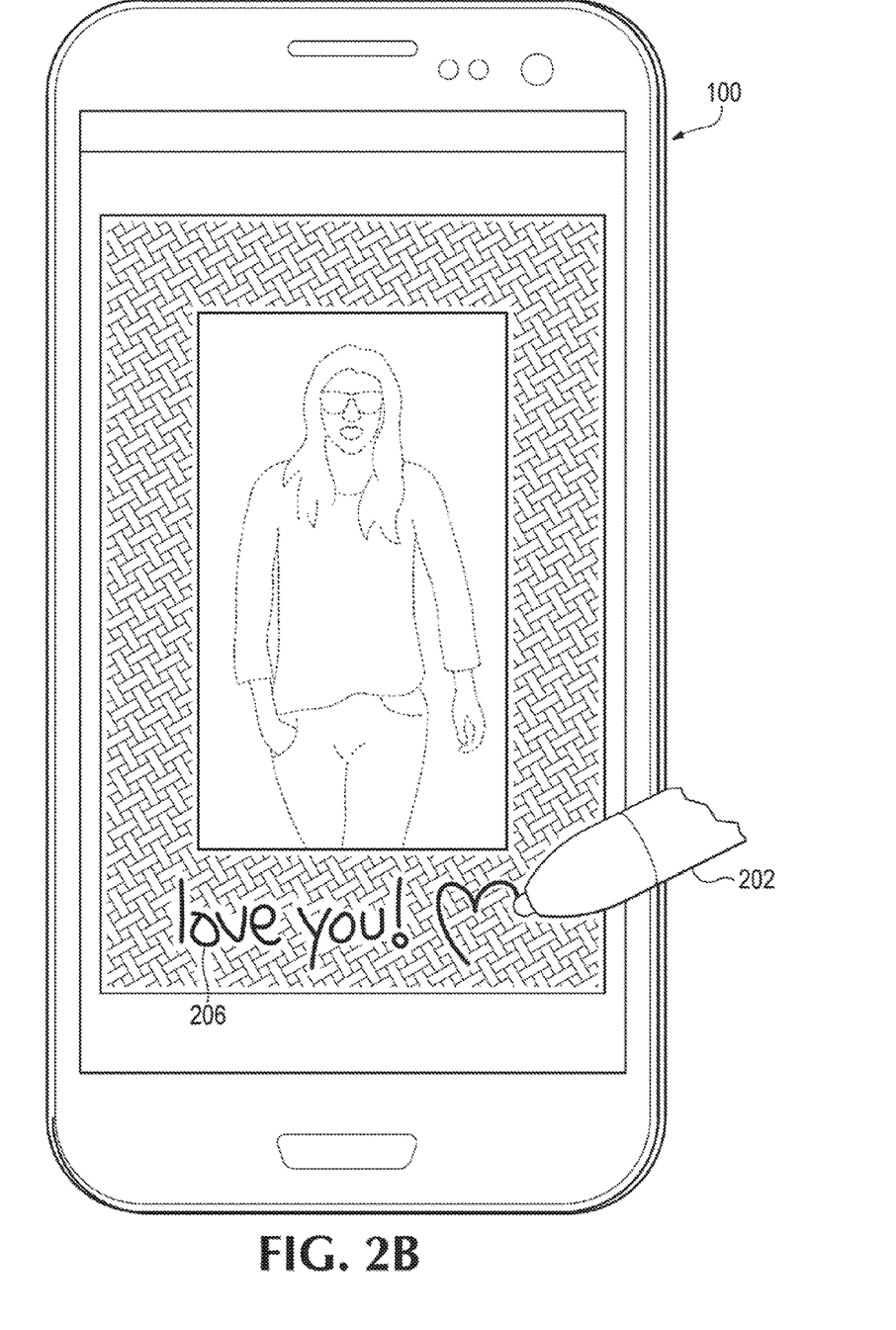

FIGS. 2A-B illustrate examples of digitally handwritten customizations that may be made by a user using an input device 202. Referring to FIG. 2A, the customizations made to the selected frame 104 may include graphical images, such as a border 204. As an example, the application may provide a color palette to the user in order to use a variety of colors when making the customizations. The application may extract features that identify the border 204 using one or more of the above-described image analysis techniques. For example, the application may detect the cross-hatching pattern of the border 204 brawn by or provided to the user using the input device 202. The features of the cross-hatching pattern may be used to identify the digital content represented by the customized image, addition, the colors used by the user for making the customizations may be collected as the pixels of the customized image is analyzed, in order to further identify the extracted features.

Referring to FIG. 2B, the digitally handwritten customizations made by the user to the selected frame 104 may include handwritten text 206. As an example, the application may extract features that identify the handwritten text 206 (e.g., converting the text to digital data) by using online character recognition, which involves sensing handwritten characters as they are written, and converting them to digital characters. With online character recognition, information regarding directionality of the handwriting strokes made by the user may be tracked in the recognition method, which may produce more accurate results when compared to offline character recognition techniques such as OCR, which involve sensing characters from an image by optical scanning.

Sensing of the handwritten characters may be based on the spline function. Splines are a class of functions that are used in data interpolation and/or smoothing. For example, when extracting features of the handwritten text 206, the application may define a series of splines by interpolation, which is a piece wise polynomial function used to identify the handwritten text 206.

After making the digitally handwritten customizations to the selected frame 104, the features identified in the selected frame 104 and/or the features extracted from the handwritten customizations (e.g., border 204 and handwritten text 206) may be uploaded to a remote database via the Internet. In addition to the features, the digital content originally selected by the user and the customized image may be uploaded to the remote database. The features of the customized image may function as a digital fingerprint of the image, and may be used to query the remote database in order to identify and retrieve the associated digital content, as will be further described.

The remote database may be stored on any computing device group of computing devices remote from portable computing device 100 and configured to send and receive network requests, send and receive data, end/or otherwise communicate with the portable computing device 100 via the Internet. As used herein, "computing device" may be a server, computer networking device, chip set, desktop computer, notebook computer, workstation, or any other processing device or equipment.

After customizing the image, which is representative of the digital content originally selected by the user, the customized image (or representative image) may be provided to a recipient. As an example, the customized image may be provided to the recipient in electric form, such as an e-card, or as printed content on physical media, such as a printed version of the customized image on a greeting card.

Figure 3:
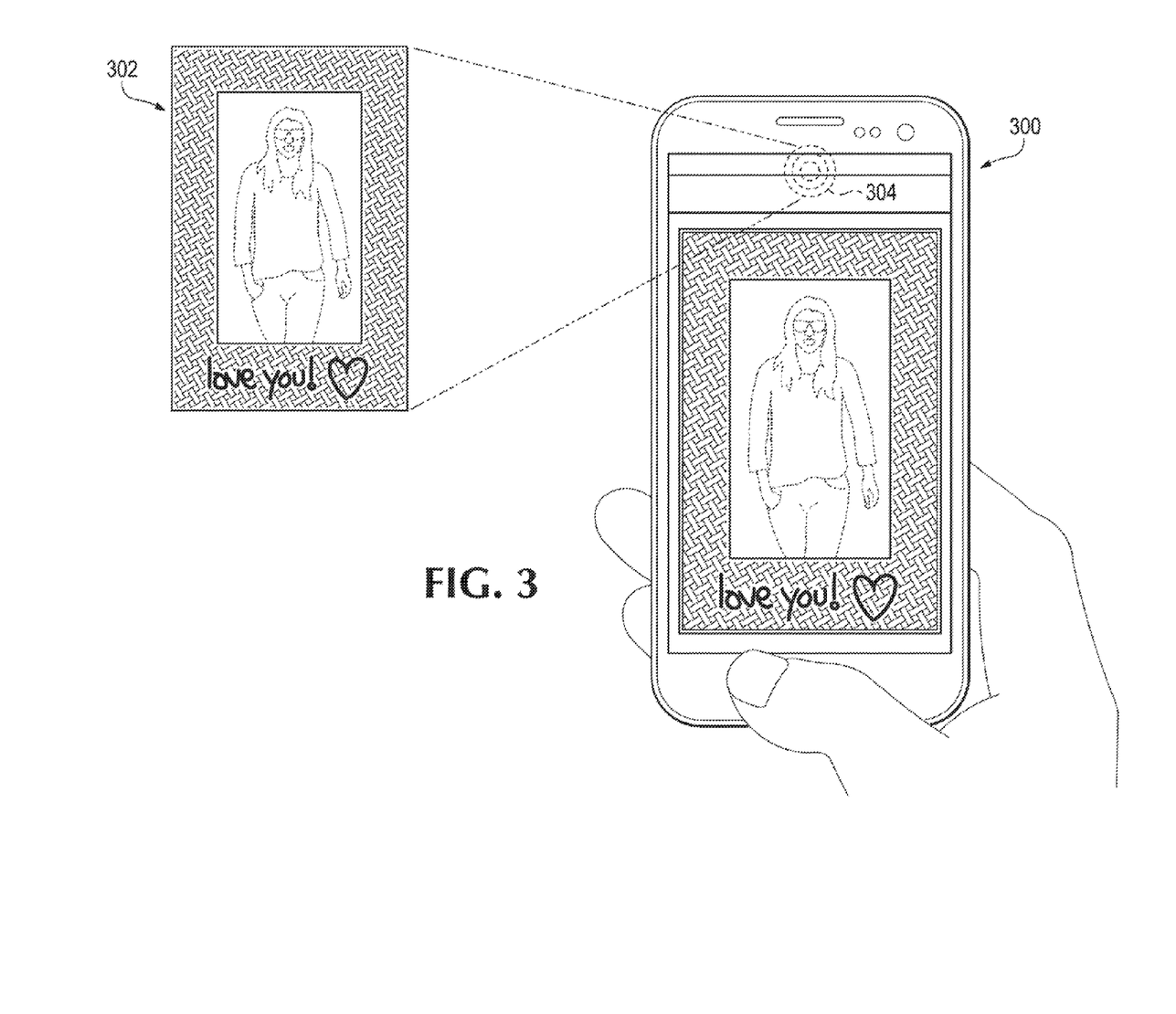
FIG. 3 illustrates the capturing of the customized image by a portable computing device, according to an example.

FIG. 3 illustrates the capturing of the customized image 302 by a portable computing device 300 of a recipient, according to an example. Using an application stored on the device 300 of the recipient, the recipient may capture an image that is representative of the customized image 302 using, for example, a camera 304 of the device 300. Capturing the image that is representative of the customized image 302 via the camera 304 may include positioning the customized image 302 and/or the device 300 so that the representation of the customized image 302 may be illustrated on the GUI of the device 300 (as shown). As an example, the recipient may download and install the application in order to view the digital content associated with the customized image 302, as will be further described. The application for viewing the digital content associated with the customized image 302 may be the same application used for creating the customized image.

After capturing the image that is representative of the customized image 302 via the camera of the device 300, the application may use image analysis techniques for extracting features that are representative of the captured image. As an example, facial recognition techniques may be used for detecting the facial features illustrated in the captured image. In addition, image analysis techniques may be used for extracting features from the captured image that pertain to a representation of the digitally handwritten customizations made by the user when creating the customized image 302 (see FIGS. 2A-B). For example, the application may detect the cross-hatching pattern of the border of the customized image 302, and extract features of the border. As another example, the application may extract features that identify the handwritten text entered by the user ("love you!") by using offline character recognition techniques, such as OCR.

Upon extracting the features from the captured image, one or more of the features may be used as a digital fingerprint for querying the remote database for the digital content associated with the captured image. For example, features at least from the digitally handwritten customizations may be used to query the remote database. Digital content identified in the remote database by using the features from the digitally handwritten customizations may then be retrieved from the remote database and viewed on the recipient's device 300.

As an example, as the recipient positions the device 300 over the customized image 302, so that a representation of the customized image 302 is illustrated on the GUI of the device 300, the digital content associated with the customized image 302 may begin playing on the device 300 upon identification and retrieval from the remote database. This may be made possible by the principle of augmented reality, where the application may superimpose the digital content (e.g., graphics, audio, and other sensory enhancements) over the representation of the customized image 302 illustrated on the GUI of the devices 300.

Figure 4:
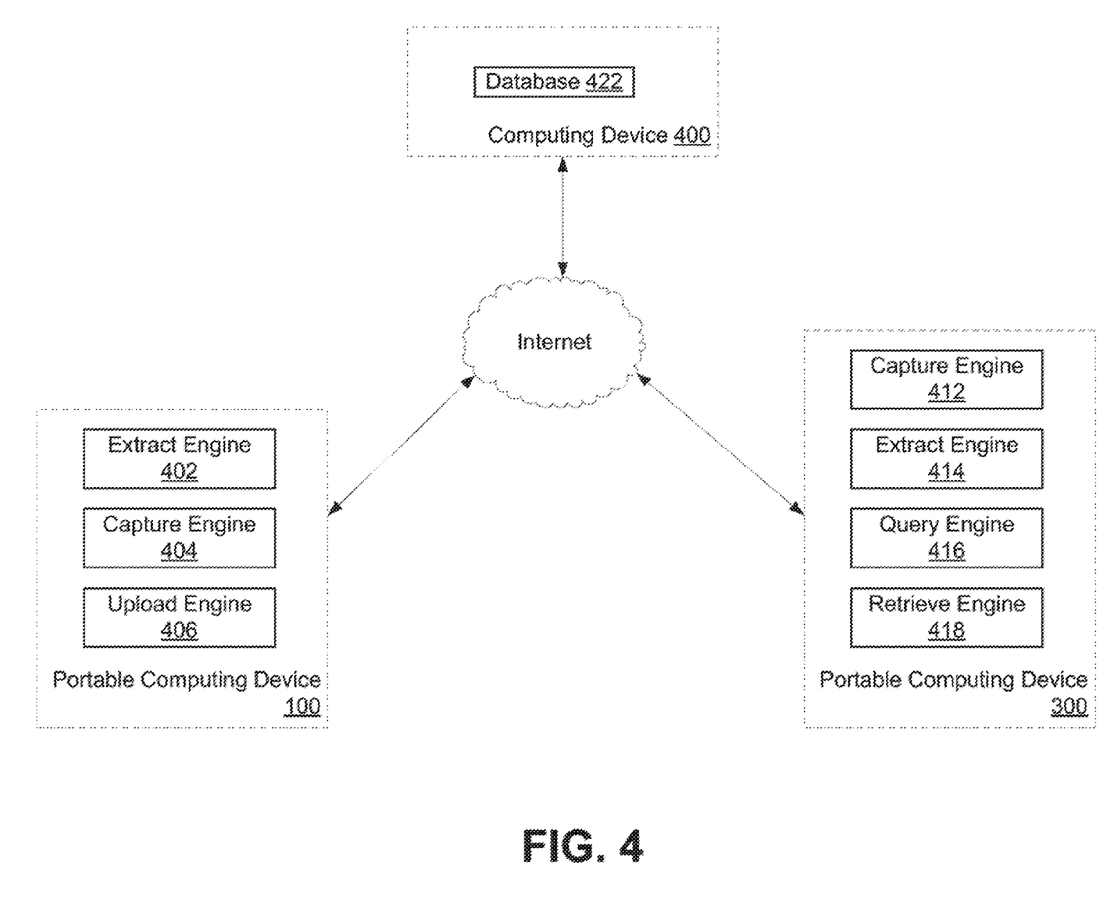
FIG. 4 is block diagram depicting an example of components of devices.
Figure 5:
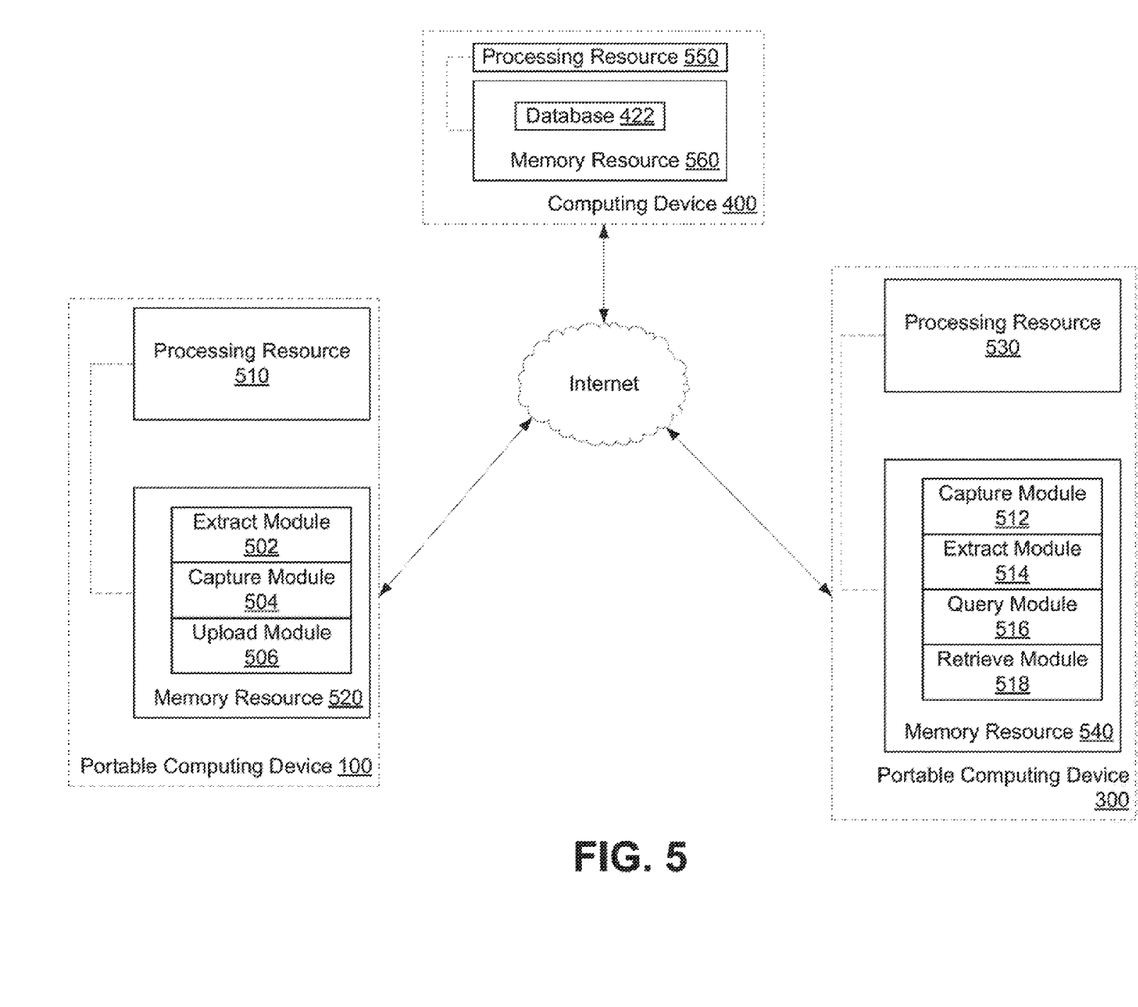
FIG. 5 is a block diagram depicting a memory resource and a processing resource of the devices illustrate in FIG. 4, according to one example.

FIGS. 4-5 depict examples of physical and logical components for implementing various embodiments. In FIG. 4, various components are identified as engines. In describing the engines, focus is on each engines designated function. However, term engine, as used herein, refers to a combination of hardware and programming configured to perform a designated function. As is illustrated later with respect to FIG. 5, the hardware of each engine, for example, may include one or both of a processor and a memory, while the programming is code stored on that memory and executable by the processor to perform the designated function. The programming can include an operating system and application. In addition, the hardware of each engine can include a display and any user input buttons.

FIG. 4 is a block diagram depict components of portable computing devices 100, 300 communicating with a computing device 400 via the Internet, as an example. The portable computing devices 100, 300 may communicate with the computing device 400 via the Internet using a wireless or mobile communications technology, such as Wi-Fi, 3G, or 4G.

In this example, the portable computing device 100 includes extract engine 402, capture engine 404, and upload engine 406. Extract engine 402 may extract frames from digital content that is selected by a user of the portable computing device 100, as described above. The digital content may have been captured via the device 100 or previously stored on the device 100. Referring back to FIG. 1, the user may select one of the frames 104 to customize and provide to others.

Capture engine 404 may capture digitally handwritten customizations made by the user to the selected frame to create a customized image. As described above in relation to FIGS. 2A-B, the user may add, via an input device 202, graphical images, such as a border 204, and handwritten text 206. The extract engine 402 may extract features at least from the handwritten customizations made to the selected frame, in an effort to identify the customized image. As an example, any suitable image analysis techniques in the field of computer vision may be used for extracting features from the digitally handwritten customizations.

Upload engine 406 may upload, via the Internet one or more of the digital content selected by the user, the customized image, and the extracted features to a remote database 422 stored on a computing device 400.

After customizing the image, which is representative of the digital content originally selected by the user, the customized image may be provided to a recipient (e.g., in print form or electronic form). The portable computing device 300 of the recipient includes capture engine 412, extract engine 414, query engine 416, and retrieve engine 418. Capture engine 412 may capture the customized image (i.e., capture an image of the customized image displayed in electronic or print form), which includes the digitally handwritten customizations made by the sender. As an example, the image may be captured by using a camera of the device 300.

Extract engine 414 may extract features at least from the handwritten customizations of the customized image using the captured image (which includes the customized image). Query engine 416 may query the remote database 422 with the extracted features from the image. Retrieve engine 418 may retrieve, from the remote database 422, digital content identified in the remote database using the extracted features from the image.

In foregoing discussion, the engines were described as combinations of hardware and programming. The engines may be implemented in a number of fashions. Referring to FIG. 5, with regards to the portable computing device 100, the programming may be processor executable instructions stored on tangible memory resource 50 and the hardware may include processing resource 510 for executing those instructions. Thus, memory resource 520 may store program instructions that when executed by processing resource 510 implement the functionalities of portable computing device 100 described above in relation to FIG. 4. Similarly, with regards to the portable computing device 300, the programming may be processor executable instructions stored on tangible memory resource 540 and the hardware may include processing resource 530 for executing those instructions. The computing device 400 may include a memory resource 560 and a processing resource 500 for executing instructions stored on the memory resource 560.

Memory resource 520, 540 represents generally any number of memory components capable of storing instructions that can be executed by processing resource 510, 530, respectively. Memory resource 520, 540 is non-transitory in the sense that it does not encompass a transitory signal but instead is made up of one or more memory components configured to store the relevant instructions. Memory resource 520 may be implemented in a single device or distributed across devices (similarly to memory resource 540). Likewise, processing resource 510, 530 represents any number of processors capable of executing instructions stored by memory resource 520, 540, respectively. Processing resource 510 may be integrated in a device or distributed across devices (similarly to processing resource 530). Further, memory resource 520 may be fully or partially integrated in the same device as processing resource 510, or it may be separate but accessible to that device and processing resource 510 (similarly to memory resource 540).

In one example, the program instructions can be part of an installation package that when installed can be executed by processing resource 510 to implement the components of the portable computing device 100 of FIG. 4 (similarly to the portable computing device 300. In this case, memory resource 520 may be a portable medium such as a CD, DVD, or flash drive or a memory maintained by a server from which the installation package can be downloaded and installed. In another example, the program instructions may be part of an application or applications already installed. Here, memory resource 520 can include integrated memory such as a hard drive, solid state drive, or the like.

In FIG. 5, with regards to the portable computing device 100, the executable program instructions stored in memory resource 520 are depicted as extract module 502, capture module 504 and upload module 506. Extract module 502 represents program instructions that when executed cause processing resource 510 to implement extract engine 402 of FIG. 4. Capture module 504 represents program instructions that when executed cause the implementation of capture engine 404. Likewise, upload module 506 represents program instructions that when executed cause the implementation of upload engine 406.

With regards to the portable computing device 300, the executable program instructions stored in memory resource 640 are depicted as capture module 512, extract module 514, query module 616, and retrieve module 518. Capture module 512 represents program instructions that when executed cause processing resource 530 to implement capture engine 412 of FIG. 4. Extract module 514 represents program instructions that when executed cause the implementation of extract engine 414. Query module 516 represents program instructions that when executed cans implementation of query engine 416. Likewise, retrieve module 518 represents program instructions that when executed cause the implementation of retrieve engine 418.

Figure 6A:
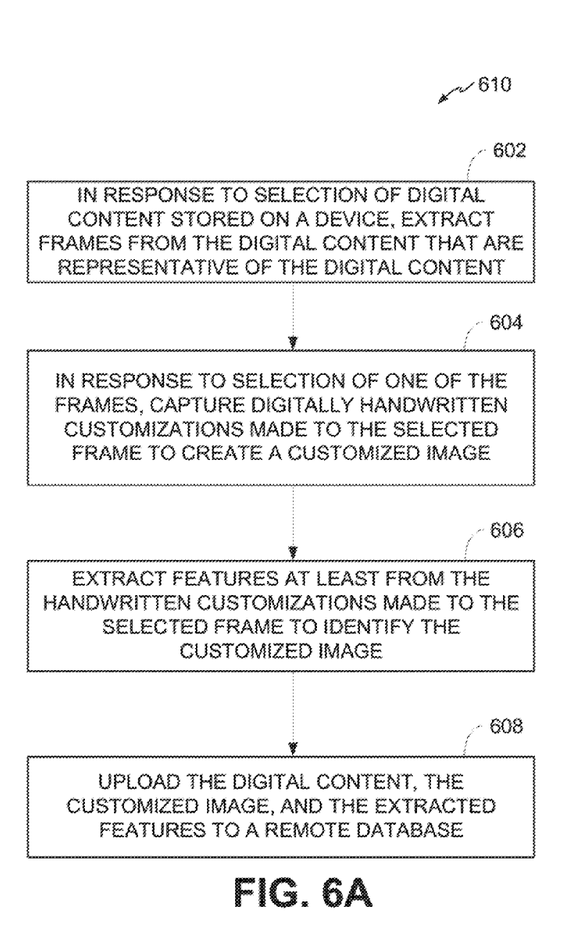
FIGS. 6A-B are flow diagrams depicting steps to implement an example.
Figure 6B:
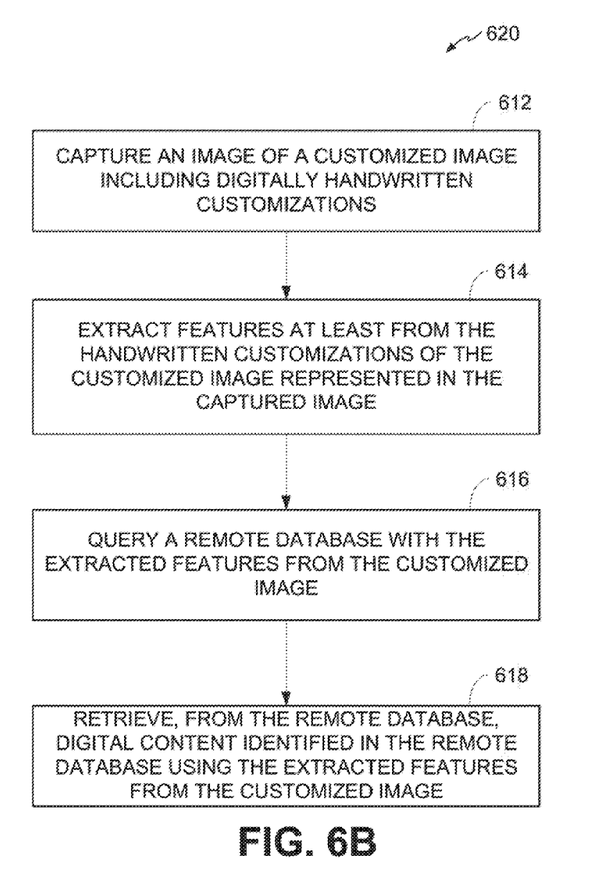

FIGS. 6A-B are example flow diagrams of steps taken to share digital content stored on a device via a customized image that is representative of the digital content. In discussing FIGS. 6A-B, reference may be made to the example scenarios illustrated in FIGS. 1-3 and the components depicted in FIGS. 4-5. Such reference is made to provide contextual examples and not to limit the manner in which the methods depicted by FIGS. 6A-B may be implemented.

FIG. 6A is a flow diagram of steps taken at a device to create the customized image that is representative of the digital content selected from the device. At 602, the device may extract frames from the digital content that are representative of the digital content. The digital content may have been captured via the device or previously stored on the device. Referring back to FIG. 1, the user select one of the frames 104 to customize and provide to others.

At 604, the device may capture digitally handwritten customizations made by the user to the selected frame, to create a customized image. Referring back to FIGS. 2A-B, the user may add, via an input device 202, graphical images, such as a border 204, and handwritten text 206. As an example, the device may capture the customizations by tracking the directionality of strokes made by the user when entering input via a touchscreen of the device (e.g., using the input device). At 606, the device may extract features at least from the handwritten customizations made to the selected frame to identify the customized image. At 608, the device may upload one or more of the digital content, the customized image, and the extracted features to a remote database.

FIG. 6B flow diagram of steps taken, at a device to view the customized image in order to retrieve the associated digital content. At 612, the device may capture an image of the customized image, which includes the digitally handwritten customizations made by the user. As an example, the image may be captured by using a camera of the device.

At 614, the device may extract features at least from the handwritten customizations of the customized image included in the captured image. At 616, the device may query the remote database with the extracted features from the customized image. At 618, the device may retrieve, from the remote database, digital content identified in the remote database using the extracted features from the image.

FIGS. 4-5 aid in depicting the architectures functionality, and operation of various embodiments. In particular, FIGS. 4-5 depict various physical and logical components. Various components are defined at least in part as programs or programming. Each such component, portion thereof, or various combinations thereof may represent in whole or in part a module, segment, or portion of code that comprises one or more executable instructions to implement any specified logical function. Each component or various combinations thereof may represent a circuit or a number of interconnected circuits to implement the specified logical function(s).

Embodiments can be realized in any memory resource for use by or in connection with a processing resource. A "processing resource" is an instruction execution system such as a computer/processor based system or ASIC (Application Specific Integrated Circuit) or other system that can fetch or obtain instructions and data from computer; readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 6A-B show a specific order of execution, the order of execution may differ from that which is depicted. For example, the order of execution of two or more blocks or arrows may be different from the order shown. Also, two or more blocks shown in succession may be executed concurrently or with partial concurrence.

What is claimed is:

1. A method for a device, comprising:
in response to selection of digital content stored on the device, extracting, by a processor of the device, a frame from the digital content that is representative of the digital content;
in response to an input of customized features made to the frame, capturing, by the processor, the customized features made to the frame to create a customized image;
subsequent to capturing the customized features made to the frame, extracting, by the processor, one feature from the captured customized features to represent a digital fingerprint of the customized image; and
uploading the digital content, the customized image, and the extracted feature that represents the digital fingerprint of the customized image to a remote database.

2. The method of claim 1, wherein capturing the customized features made to the frame comprises capturing handwriting input entered via a touchscreen of the device.

3. The method of claim 2, wherein the handwriting input made to the frame comprise graphical images and text written on the touchscreen with an input device.

4. The method of claim 2, wherein capturing the customized features made to the frame comprises tracking a directionality of strokes made when the handwriting input is entered via the touchscreen of the device.

5. The method of claim 1, wherein extracting the feature from the captured customized features comprises using image analysis techniques including object recognition and handwriting recognition to select a portion of the customized features that includes an object or handwriting to represent the digital fingerprint of the customized image.

6. The method of claim 1, further comprising: defining a series of splines to be used as a class of functions in capturing the customized features made to the frame.

7. A portable computing device comprising:
a processor; and
a memory storing instruction that when executed cause the processor to:
in response to selection of digital content stored on the portable computing device, extract a frame from the digital content that is representative of the digital content;
in response to an input of customized features made to the frame, capture the customized features made to the frame to create a customized image including the customized features;
subsequent to capturing the customized features made to the frame, extract one feature from the captured customized features to represent a digital fingerprint of the customized image; and
upload the digital content, the customized image, and the extracted feature that represents the digital fingerprint of the customized image to a remote database.

8. The portable computing device of claim 7, wherein the processor is to capture the frame from the digital content by using a camera of the portable computing device.

9. The portable computing device of claim 7, wherein the processor is to extract the feature from the captured customized features by using image analysis techniques including object recognition and handwriting recognition to select a portion of the captured customized features that includes an object or handwriting to represent the digital fingerprint of the customized image.

10. The portable computing device of claim 7, wherein the instructions are to cause the processor to define a series of splines to be used as functions to capture the customized features made to the frame.

11. The portable computing device of claim 7, wherein the feature extracted from the captured customized features comprises handwritten text detected by optical character recognition (OCR).

12. A non-transitory memory resource storing instructions that when executed cause a processing resource to:
  in response to selection of digital content stored on the device, extract a frame from the digital content that is representative of the digital content;
  in response to an input of customized features made to the frame, capture the customized features made to the frame to create a customized image;
  subsequent to capturing the customized features made on the frame, extract one feature from the captured customized features to identify to represent a digital fingerprint of the customized image; and
  upload the digital content, the customized image, and the extracted feature that represents the digital fingerprint of the customized image to a remote database.

13. The non-transitory memory resource of claim 12, wherein the instructions to capture the customized features made to the frame comprises instructions to capture handwriting input entered via a touchscreen of the device using an input device.

14. The non-transitory memory resource of claim 13, wherein the instructions to capture the customized features made to the frame comprises instructions to track a directionality of strokes made when the handwriting input is entered via the touchscreen of the device.

15. The non-transitory memory resource of claim 12, wherein the instructions to extract the feature from the captured customized features comprises instructions to use image analysis techniques including object recognition and handwriting recognition to select a portion of the customized features that includes an object or handwriting to represent the digital fingerprint of the customized image.

* * * * *

UNITED STATES PATENT AND TRADEMARK OFFICE
CERTIFICATE OF CORRECTION

PATENT NO. : 9,940,510 B2
APPLICATION NO. : 15/023494
DATED : April 10, 2018
INVENTOR(S) : Andre Le et al.

Page 1 of 1

It is certified that error appears in the above-identified patent and that said Letters Patent is hereby corrected as shown below:

In the Claims

In Column 10, Line 1, in Claim 12, after features delete "to identify".

Signed and Sealed this
Third Day of December, 2019

Andrei Iancu
*Director of the United States Patent and Trademark Office*